United States Patent
Kang et al.

(10) Patent No.: US 8,210,158 B2
(45) Date of Patent: Jul. 3, 2012

(54) EGR CONTROL IN HCCI ENGINES

(75) Inventors: Jun-Mo Kang, Ann Arbor, MI (US); Hanho Yun, Oakland Township, MI (US)

(73) Assignee: GM Global Technology Operations LLC, Detroit, MI (US)

(*) Notice: Subject to any disclaimer, the term of this patent is extended or adjusted under 35 U.S.C. 154(b) by 280 days.

(21) Appl. No.: 12/641,680

(22) Filed: Dec. 18, 2009

(65) Prior Publication Data
US 2011/0146637 A1    Jun. 23, 2011

(51) Int. Cl.
*F02B 47/08* (2006.01)
*F02B 47/00* (2006.01)

(52) U.S. Cl. .................. 123/568.19; 701/108

(58) Field of Classification Search ............ 123/568.19, 123/568.21, 568.22, 568.11, 542; 701/108
See application file for complete search history.

(56) References Cited

U.S. PATENT DOCUMENTS

| | | | |
|---|---|---|---|
| 6,953,409 B2 | 10/2005 | Schmidt et al. | |
| 6,994,072 B2 | 2/2006 | Kuo et al. | |
| 7,128,047 B2 | 10/2006 | Kuo et al. | |
| 7,231,905 B1* | 6/2007 | Haskara et al. | 123/435 |
| 2006/0016438 A1 | 1/2006 | Kang | |
| 2006/0196469 A1* | 9/2006 | Kuo et al. | 123/305 |
| 2007/0215095 A1* | 9/2007 | Kakuya et al. | 123/295 |
| 2008/0202469 A1* | 8/2008 | Kang et al. | 123/435 |

* cited by examiner

*Primary Examiner* — Mahmoud Gimie

(57) ABSTRACT

An internal combustion engine operates in an unthrottled condition during HCCI operation while preferred combustion phasing is determined. An EGR mass flow rate is commanded to correspond with the preferred combustion phasing. The EGR valve is controlled to achieve commanded EGR mass flow rate. Position of the throttle valve is controlled to achieve commanded EGR mass flow rate when the commanded EGR mass flow rate exceeds control authority of the EGR valve.

17 Claims, 4 Drawing Sheets

EGR CONTROL IN HCCI ENGINES

TECHNICAL FIELD

This disclosure relates to homogeneous charge compression ignition (HCCI) spark ignition engines.

BACKGROUND

The statements in this section merely provide background information related to the present disclosure and may not constitute prior art.

Spark-ignition (SI) engines can be configured to operate in a homogeneous-charge compression-ignition (HCCI) combustion mode, also referred to interchangeably as controlled auto-ignition (HCCI) combustion, under predetermined speed/load operating conditions. The controlled auto-ignition (HCCI) combustion includes a distributed, flameless, auto-ignition combustion process that is controlled by oxidation chemistry.

Controlled auto-ignition (HCCI) combustion is a distributed kinetically-controlled combustion process with the engine operating at a dilute air/fuel mixture, i.e., lean of an air/fuel stoichiometric point, with relatively low peak combustion temperatures, resulting in low nitrous oxides (NOx) emissions. The homogeneous air/fuel mixture minimizes occurrences of rich zones that form smoke and particulate emissions.

In an HCCI engine, phasing of auto-ignited combustion strongly depends on the cylinder charge temperature, composition, and cylinder pressure, at intake valve closing. Hence, the control inputs to the engine, such as amount of fuel, fuel injection timing, spark timing, EGR valve open position, and intake and exhaust valve profiles, must be carefully coordinated to ensure that those key cylinder variables are within a range where the auto-ignited combustion can be robustly achieved. Among those inputs, the amount of EGR available to the engine is controlled by the open position of the EGR valve and may be considered in terms of EGR mass flow rate. Control authority of the EGR valve relates to an ability to adjust the EGR mass flow rate by adjusting open position of the EGR valve. One having ordinary skill in the art understands that an EGR valve may have an open position that can be controlled between 0% to 100%, whereas the EGR mass flow rate can be adjusted for EGR valve open positions, e.g., between 0% to 30%, depending upon engine operating conditions. Increasing the EGR valve open position above a control authority threshold does not result in additional EGR mass flow rate at the engine operating conditions because the effective area of EGR valve does not increase much once EGR valve opens more than 30%, as in the present example. The control authority of the EGR valve can be determined by an engine control module based on various feedback parameters such as intake manifold pressure, absolute pressure, combustion phasing, temperature, and other engine parameters.

The EGR mass flow rate available to the engine is limited by an amount related to the pressure within the intake manifold and the EGR valve opening, e.g., if the intake manifold pressure is high, the maximum EGR mass flow rate may be limited before the EGR valve reaches a fully opened position. This limitation restricts the useable engine range as a significant amount of EGR is necessary at high load and high speed to slow down cylinder pressure rise thereby reducing combustion noise and achieving a higher maximum fuel rate.

SUMMARY

An engine includes an EGR valve, a throttle valve, and a combustion phasing controller controlling combustion during operation in an HCCI combustion mode. A method for controlling operation of the internal combustion engine includes operating the engine in an unthrottled condition in the HCCI combustion mode, determining a preferred combustion phasing, commanding an EGR mass flow rate corresponding to the preferred combustion phasing, controlling the EGR valve to a respective predetermined position to achieve the commanded EGR mass flow rate and controlling the throttle valve to a respective predetermined position to achieve the commanded EGR mass flow rate when the commanded EGR mass flow rate exceeds a control authority threshold of the EGR valve.

BRIEF DESCRIPTION OF THE DRAWINGS

One or more embodiments will now be described, by way of example, with reference to the accompanying drawings, in which.

DETAILED DESCRIPTION

Figure 1:
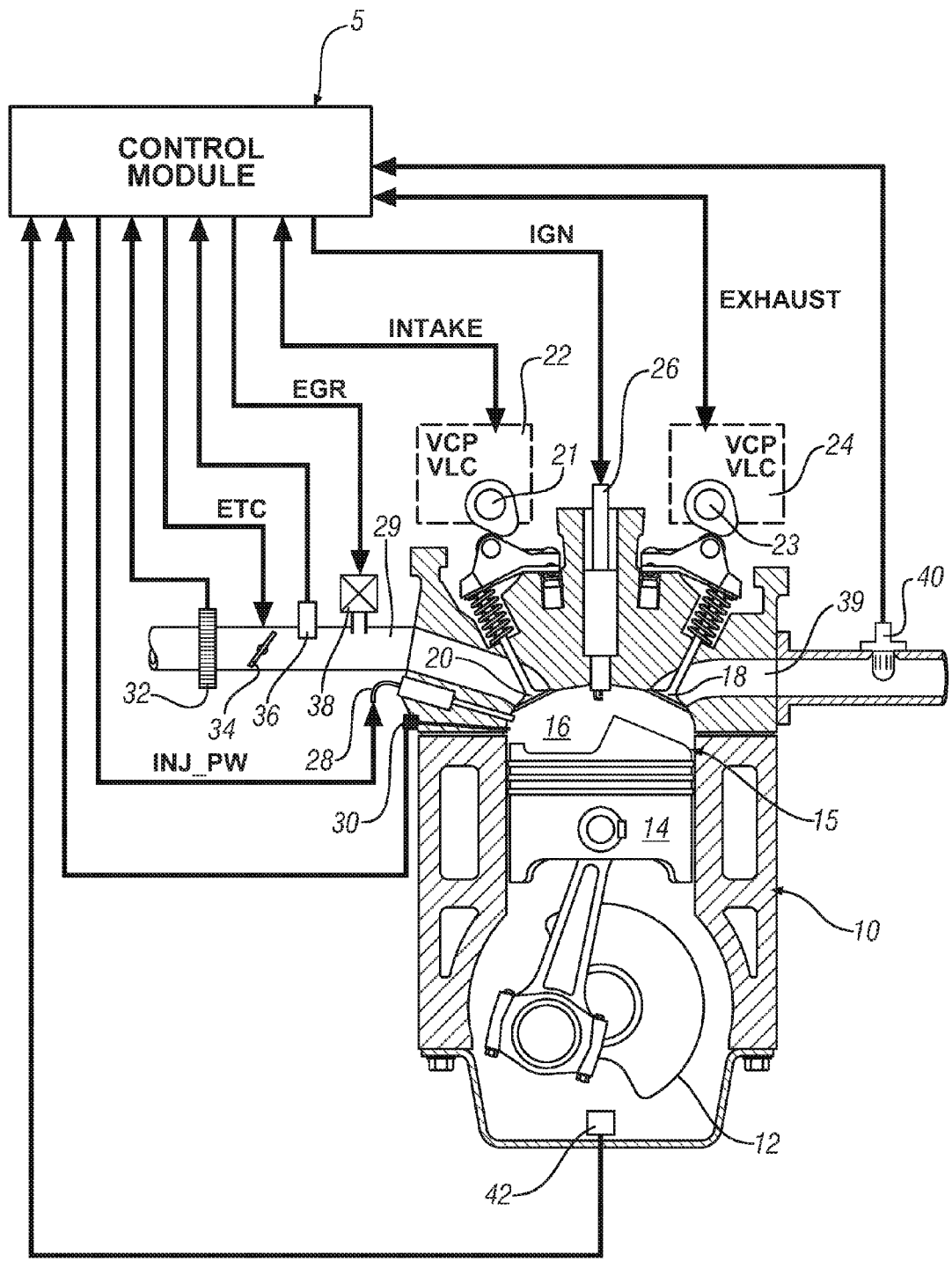
FIG. 1 is a detailed schematic drawing of an internal combustion engine showing an accompanying control module that includes a combustion phasing controller, in accordance with the present disclosure.

Referring now to the drawings, wherein the drawings are for the purpose of illustrating certain exemplary embodiments only and not for the purpose of limiting the same, FIG. 1 is a detailed schematic drawing of an internal combustion engine 10 showing an accompanying control module 5 that includes a combustion phasing controller 110 (FIG. 2) that have been constructed in accordance with an embodiment of the disclosure. The engine 10 is selectively operative in a plurality of combustion modes, including a controlled auto-ignition (HCCI) combustion mode, a homogeneous spark-ignition combustion mode, and an intermediate stratified-charge spark-ignition combustion mode. The engine 10 is selectively operative at a stoichiometric air/fuel ratio and at an air/fuel ratio that is primarily lean of stoichiometry. Preferably, the engine is running in the HCCI mode utilizing the air/fuel ratio primarily lean of stoichiometry and monitoring combustion phasing. The disclosure can be applied to various internal combustion engine systems and combustion cycles that may utilize a combustion phasing controller 110.

In one embodiment the engine 10 can be coupled to a transmission device to transmit tractive power to a driveline of a vehicle. The transmission can include a hybrid transmission including torque machines operative to transfer tractive power to a driveline.

The exemplary engine 10 includes a multi-cylinder direct-injection four-stroke internal combustion engine having reciprocating pistons 14 slidably movable in cylinders 15 which define variable volume combustion chambers 16. Each piston 14 is connected to a rotating crankshaft 12 by which linear reciprocating motion is translated to rotational motion. An air intake system provides intake air to an intake manifold 29 which directs and distributes air into intake runners of the combustion chambers 16. The air intake system includes airflow ductwork and devices for monitoring and controlling the air flow. The air intake devices preferably include a mass airflow sensor 32 for monitoring mass airflow and intake air temperature. A throttle valve 34 preferably includes an electronically controlled device that is used to control airflow to the engine 10 in response to a control signal (ETC) from the control module 5 or the combustion phasing controller 110. A pressure sensor 36 in the intake manifold 29 is configured to monitor manifold absolute pressure (MAP) and barometric pressure such that a pressure differential may be obtained and during wide open throttle (WOT) conditions, are substantially similar. An external EGR system includes external flow passage for recirculation of exhaust gases from engine exhaust to the intake manifold 29, having a flow control valve referred to as an exhaust gas recirculation (EGR) valve 38. The control module 5 and the combustion phasing controller 110 are operative to control the mass flow rate of recirculated exhaust gas to the intake manifold 29 by controlling opening of the EGR valve 38 in response to a control signal EGR.

Airflow from the intake manifold 29 into the combustion chamber 16 is controlled by one or more intake valve(s) 20. Exhaust flow out of the combustion chamber 16 is controlled by one or more exhaust valve(s) 18 to an exhaust manifold 39. The engine 10 is equipped with systems to control and adjust openings and closings of the intake and exhaust valves 20 and 18. In one embodiment, the openings and closings of the intake and exhaust valves 20 and 18 can be controlled and adjusted by controlling intake and exhaust variable cam phasing/variable lift control (VCP/VLC) devices 22 and 24 respectively. The intake and exhaust VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 12, thus linking openings and closings of the intake and exhaust valves 20 and 18 to positions of the crankshaft 12 and the pistons 14.

The engine 10 includes a fuel injection system, including a plurality of high-pressure fuel injectors 28 each configured to directly inject a mass of fuel into one of the combustion chambers 16 in response to a signal from the control module 5. The fuel injectors 28 are supplied pressurized fuel from a fuel distribution system.

The engine 10 includes a spark-ignition system by which spark energy can be provided to a spark plug 26 for igniting or assisting in igniting cylinder charges in each of the combustion chambers 16 in response to a signal (IGN) from the control module 5.

The engine 10 is equipped with various sensing devices for monitoring engine operation, including a crank sensor 42 having output RPM and operative to monitor crankshaft rotational position, i.e., crank angle and speed, in one embodiment a combustion sensor 30 configured to monitor combustion, and an exhaust gas sensor 40 configured to monitor exhaust gases, typically an air/fuel ratio sensor. The combustion sensor 30 includes a sensor device operative to monitor a state of a combustion parameter and is depicted as a cylinder pressure sensor operative to monitor in-cylinder combustion pressure. The output of the combustion sensor 30 and the crank sensor 42 are monitored by the control module 5 which determines combustion phasing, i.e., timing of combustion pressure relative to the crank angle of the crankshaft 12 for each cylinder 15 for each combustion cycle or similar methods as may be known by those having ordinary skill in the art. The combustion sensor 30 can also be monitored by the control module 5 to determine a mean-effective-pressure (IMEP) for each cylinder 15 for each combustion cycle. Preferably, the engine 10 and control module 5 are mechanized to monitor and determine states of IMEP for each of the engine cylinders 15 during each cylinder firing event. Alternatively, other sensing systems can be used to monitor states of other combustion parameters within the scope of the disclosure, e.g., ion-sense ignition systems, and non-intrusive cylinder pressure sensors.

Control module, controller and similar terms mean any suitable combination of one or more Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs, combinational logic circuit(s), input/output circuit(s) and devices, appropriate signal conditioning and buffer circuitry, and other suitable components to provide the described functionality. The control module has a set of control algorithms, including resident software program instructions and calibrations stored in memory and executed to provide the desired functions. The algorithms are preferably executed during preset loop cycles. Algorithms are executed, such as by a central processing unit, and are operable to monitor inputs from sensing devices and other networked control modules, and execute control and diagnostic routines to control operation of actuators. Loop cycles may be executed at regular intervals, for example each 3.125, 6.25, 12.5, 25 and 100 milliseconds during ongoing engine and vehicle operation. Alternatively, algorithms may be executed in response to occurrence of an event.

In operation, the control module 5 monitors inputs from the aforementioned sensors to determine states of engine parameters. The control module 5 is configured to receive input signals from an operator (e.g., via an accelerator pedal and a brake pedal, not shown) to determine an operator torque request. The control module 5 monitors the sensors indicating the engine speed and intake air temperature, and coolant temperature and other ambient conditions.

The control module 5 executes algorithmic code stored therein to control the aforementioned actuators to form the cylinder charge, including controlling throttle position, opening position of the EGR valve 38 to control flow of recirculated exhaust gases, and intake and/or exhaust valve phasing on engines so equipped. The control module 5 can operate to turn the engine 10 on and off during ongoing vehicle operation, and can operate to selectively deactivate a portion of the combustion chambers 15 or a portion of the intake and exhaust valves 20 and 18 through control of fuel and spark and valve deactivation. The control module 5 can control air/fuel ratio based upon feedback from an exhaust gas sensor 40.

The disclosure pertains particularly to unthrottled operation of the engine in the HCCI combustion mode that may include a spark ignition backup. During the HCCI combustion mode operation, the throttle valve 34 is preferably substantially wide-open in the controlled auto-ignition combustion modes with the engine 10 preferably controlled at a lean or stoichiometric air/fuel ratio. In one embodiment, in-cylinder EGR mass is controlled to a high dilution rate, e.g., greater than 40% of cylinder air-charge. The intake and exhaust valves 20 and 18 are in a low-lift valve position and the intake and exhaust lift timing operate in a negative valve overlap (NVO) condition. One or more fuel injection events can be executed during an engine cycle including at least one injection during a compression phase.

Figure 2:
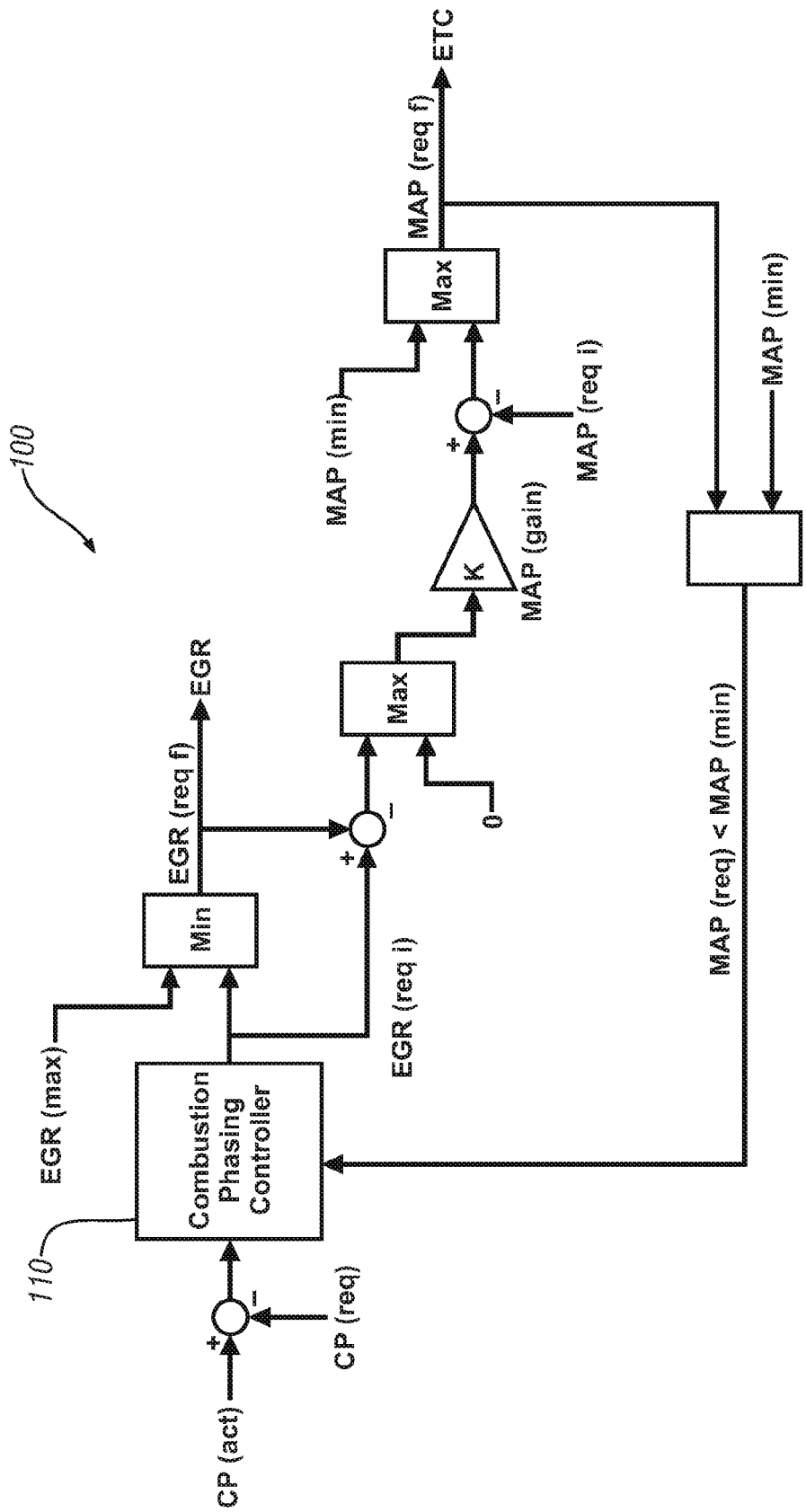
FIG. 2 schematically shows an engine control scheme for controlling EGR mass flow rate during HCCI combustion mode to achieve a preferred combustion phasing corresponding to the operator torque request, in accordance with the present disclosure.

FIG. 2, described with reference to the engine of FIG. 1, schematically shows an engine control scheme 100 for controlling EGR mass flow rate during HCCI combustion mode to achieve a preferred combustion phasing corresponding to the operator torque request. Combustion phasing may be determined from the inputs of the crank sensor 42 in relation to the combustion sensor 30 in each cylinder, or other methods as known by those having ordinary skill in the art. The combustion phasing controller 110 monitors actual combustion phasing CP (act) and the preferred combustion phasing CP (req) to determine adjustments to engine operation to achieve the preferred combustion phasing CP (req). The combustion phasing controller 110 commands an initial EGR mass flow rate EGR (req i) and an intake manifold pressure MAP (req f) to achieve the preferred combustion phasing, the last of which may be achieved by controlling the throttle valve 34. The commanded initial EGR mass flow rate EGR (req i) may exceed a control authority threshold EGR (max) for the EGR valve 38, at which point the control authority of the EGR valve 38 is exceeded and the EGR valve 38 is unable to effect further increases in EGR mass flow rate within the intake manifold 29 due to the intake manifold pressure. The control authority threshold EGR (max) varies, and is associated with or correlates to various engine operating conditions and ambient conditions, e.g., atmospheric pressure, humidity, temperature, and may be determined as a function of one or more of such operating and ambient conditions.

If the combustion phasing controller 110 commands the initial EGR mass flow rate EGR (req i) that is less than the control authority threshold EGR (max), the combustion phasing controller 110 sends a control signal EGR (req f) to adjust the EGR valve 38 to achieve the desired combustion phasing. Once the EGR valve 38 has reached the control authority threshold, i.e., EGR (req i) is greater than EGR (max), any additional request for increased EGR mass flow rate is converted into an intake manifold pressure gain signal MAP (gain). The MAP (gain) signal is used to modify a predetermined initial intake manifold pressure signal MAP (req i) for creating a final intake manifold pressure signal output MAP (req f). The MAP (req f) signal is compared with an intake manifold pressure minimum threshold MAP (min). The MAP (min) signal is a predetermined point that may represent a decrease in engine efficiency and an associated decrease in fuel economy, at which point HCCI combustion is no longer feasible, or another point previously determined. Provided the MAP (req f) signal is greater than the MAP (min) signal, the MAP (req f) control signal is sent to adjust the throttle valve 34. Since the HCCI combustion mode operates with the position of the throttle valve 34 substantially wide open throttle (WOT), starting intake manifold pressure is slightly less than ambient pressure. The intake manifold pressure may be adjusted by closing the throttle valve 34 thereby reducing the intake manifold pressure and allowing additional EGR mass flow into the intake manifold 29 thus extending the useable engine speed and load operating range for the engine 10 in the HCCI mode.

Figure 3:
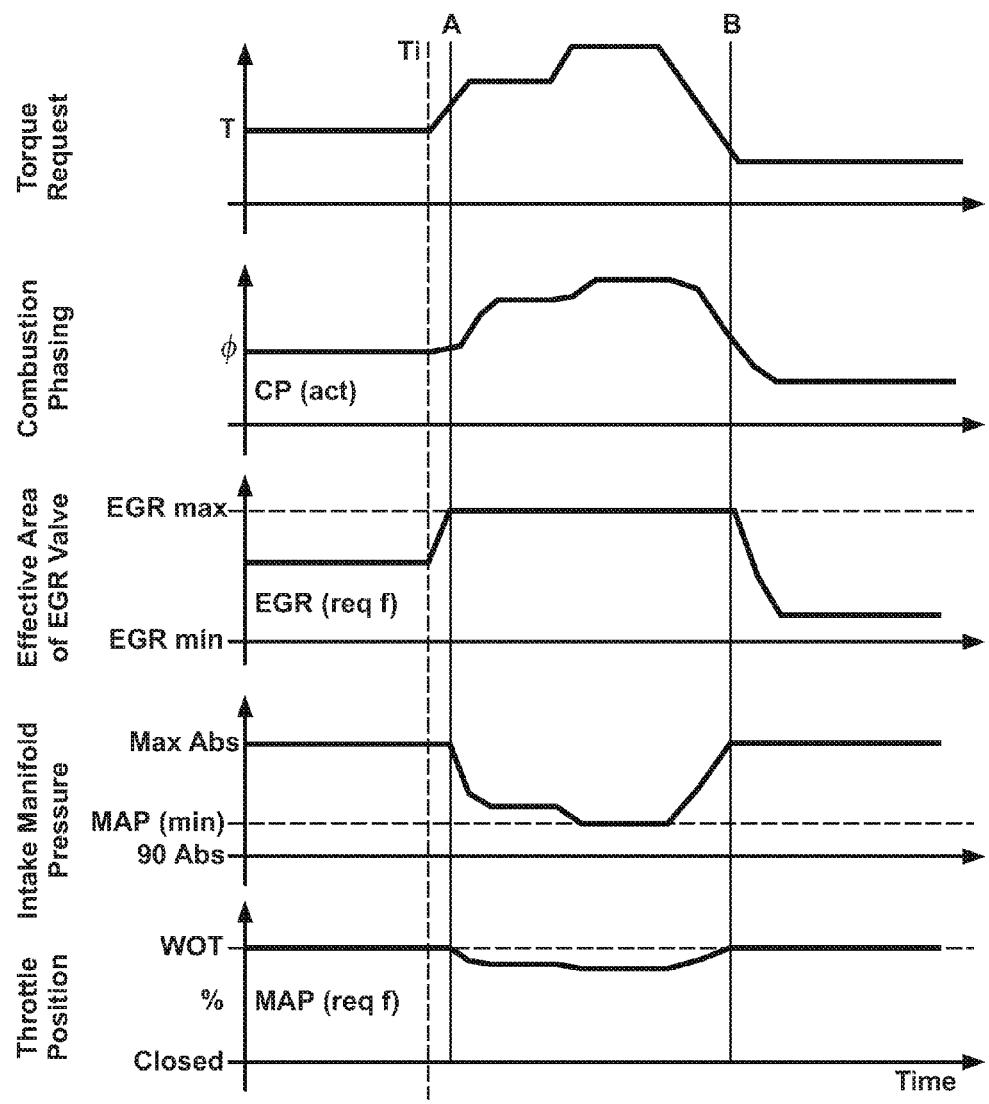
FIG. 3 graphically depicts time-based examples of actuator commands for operating an exemplary engine in the HCCI combustion mode, in accordance with the present disclosure.

FIG. 3 graphically depicts time-based examples of actuator commands for operating an exemplary engine in the HCCI combustion mode, as disclosed. Operation of the engine in HCCI combustion mode is shown to the left of a time represented by line A. The engine operates with the throttle valve 34 substantially at wide open throttle (WOT) causing the starting intake manifold pressure to be slightly less than ambient pressure while the EGR valve 38 is controlled below the control authority threshold.

An additional amount of requested torque is initiated at time Ti which causes the preferred EGR mass flow to reach maximum flow at time A. Between times A and B, the speed and/or load of the engine exceed the control authority threshold of the EGR valve 38, i.e., the EGR valve 38 has reached its maximum effective area and therefore the preferred EGR mass flow is no longer achievable at the present intake manifold pressure. The combustion phasing controller 110 recognizes the high torque request condition when parameters EGR (max) and EGR (req i) have been compared. The throttle valve 34 may then be adjusted from the unthrottled position thereby reducing the pressure in the intake manifold 29 and causing additional EGR mass to flow into the intake manifold 29. Once the engine load and/or speed return to a range in which EGR valve 38 adjustment may effectively control EGR mass flow entering the intake manifold, the EGR valve 38 only control resumes and the throttle valve 34 returns to the unthrottled position. The return to the EGR valve 38 only control can be seen on the graphs to the right of time B.

Figure 4:
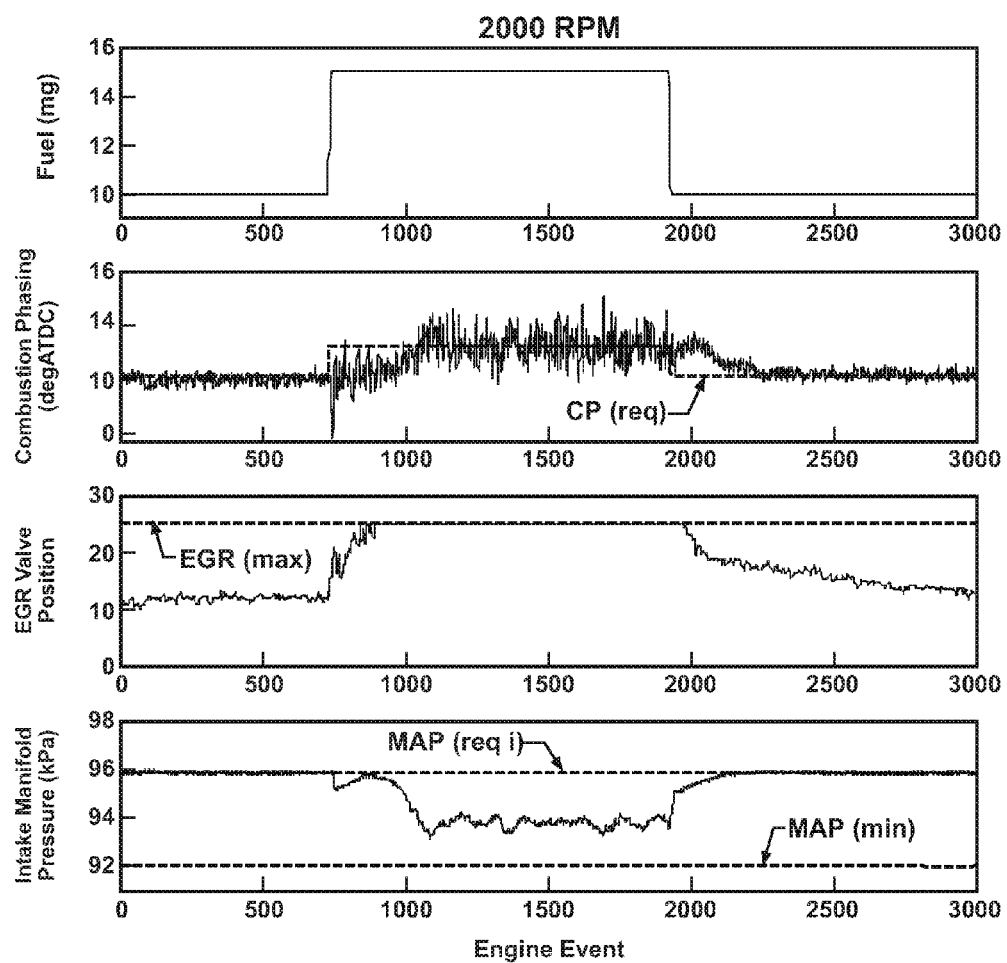
FIG. 4 graphically depicts actual data associated with an exemplary engine operating in an HCCI combustion mode using an engine control scheme for controlling EGR mass flow rate to achieve a preferred combustion phasing, in accordance with the present disclosure.

FIG. 4 graphically depicts actual data associated with an exemplary engine operating in an HCCI combustion mode using the aforementioned engine control scheme 100 for controlling EGR mass flow rate to achieve a preferred combustion phasing. The data parameters include engine fuel flow (mg), representative of engine load, combustion phasing (degATDC), EGR valve position as percentage open, and intake manifold pressure (kPa), each plotted during ongoing engine operation as a function of engine events. Initially, the engine 10 is at a low-load steady state operation wherein the fuel is supplied at 10 mg, the combustion phasing is approximately 9 degATDC, EGR valve position is approximately 11 percent, and intake manifold pressure is approximately 96 kPa. The fuel parameter is manipulated to approximately 15 mg to simulate an increased load condition. The combustion phasing controller 110 determines a desired combustion phasing profile (CP(req)) associated with the increased load condition which is set at approximately 12 degATDC, as indicated by the dotted line on the combustion phasing graph. The engine control scheme 100 opens the EGR valve position reaching the control authority threshold (EGR(max)) of approximately 28 percent, thereby introducing a maximum amount EGR mass into the intake manifold 29 as can be achieved during the present operating conditions. When the control authority threshold (EGR(max)) is reached without achieving the desired combustion phasing profile (CP(req)), the engine control scheme 100 adjusts the throttle valve 34 to manipulate the intake manifold pressure such that additional EGR mass is introduced into the intake manifold 29 to achieve the desired combustion phasing profile. For this exemplary engine operation, to achieve the desired phasing profile, the intake manifold pressure is adjusted to approximately 94 kPa. As the fuel parameter returns to the low-load steady state level, i.e., 10 mg, the remaining parameters also return to their previous states. The ability to adjust the intake manifold pressure due to adjusting the throttle body 34 extends the speed and load operational range at which the engine 10 is able to operate in the HCCI combustion mode.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for controlling operation of an internal combustion engine operable in an HCCI combustion mode, the engine including an EGR valve, a throttle valve, and a combustion phasing controller controlling combustion during operation in the HCCI combustion mode, the method comprising:
operating the engine in an unthrottled condition in the HCCI combustion mode;
determining a preferred combustion phasing;
commanding an EGR mass flow rate corresponding to the preferred combustion phasing;
controlling the EGR valve to a respective predetermined position to achieve the commanded EGR mass flow rate; and
controlling the throttle valve to a respective predetermined position to achieve the commanded EGR mass flow rate when the commanded EGR mass flow rate exceeds a control authority threshold of the EGR valve.

2. The method of claim 1, wherein determining the preferred combustion phasing comprises determining a preferred combustion phasing associated with operating the engine in the unthrottled condition in the HCCI combustion mode responsive to an operator torque request.

3. The method of claim 2, wherein determining the preferred combustion phasing comprises monitoring cylinder pressure and crank angle.

4. The method of claim 1, wherein the control authority threshold of the EGR valve is determined as a function of one or more engine operating conditions.

5. The method of claim 1, wherein the predetermined position of the throttle valve is determined by comparing the control authority threshold of the EGR valve to the operation of the EGR valve.

6. The method of claim 1, wherein controlling the throttle valve to the predetermined position comprises controlling the throttle valve to an increasingly closed position to decrease an intake manifold pressure.

7. The method of claim 6, wherein controlling the throttle valve is based upon comparing the intake manifold pressure to an intake manifold pressure threshold.

8. The method of claim 7, wherein the intake manifold pressure threshold comprises a minimum pressure below which the throttle valve is not further adjusted.

9. Method for controlling operation of an internal combustion engine operable unthrottled in an HCCI combustion mode and having a combustion phasing controller, the method comprising:
monitoring cylinder combustion phasing in the HCCI combustion mode;
adjusting an EGR valve position to achieve a preferred combustion phasing; and
adjusting a throttle valve position to achieve the preferred combustion phasing only when the EGR valve position exceeds a control authority threshold.

10. The method of claim 9 wherein monitoring cylinder combustion phasing comprises monitoring a cylinder pressure and a crank angle.

11. The method of claim 9 wherein adjusting the EGR valve position varies the amount of EGR mass available for HCCI combustion.

12. The method of claim 9 wherein the control authority threshold is determined as a function of one or more engine operating conditions.

13. The method of claim 9 wherein adjusting the throttle valve position is based upon a comparison of an intake manifold pressure to a predetermined minimum pressure threshold.

14. The method of claim 9 wherein the throttle valve position is controlled to a substantially wide open position when the EGR valve retreats below the control authority threshold.

15. Control for an internal combustion engine including a controllable EGR valve and a controllable throttle valve, the engine operating in an HCCI combustion mode, the method comprising:
an open loop control providing EGR valve and throttle valve position settings; and
a closed loop control providing preferred combustion phasing, actual combustion phasing, and adjustments to EGR valve and throttle valve position settings based on differences between actual combustion phasing and the desired combustion phasing, wherein the adjustments to the throttle valve position settings are determined only when the EGR valve position settings exceed a control authority threshold.

16. The control of claim 15 wherein the throttle valve position setting is limited to a minimum opening corresponding to a predetermined minimum manifold pressure.

17. The control of claim 15 wherein control authority threshold corresponds to an EGR valve position setting whereat a resultant EGR mass flow no longer modifies combustion phasing.

* * * * *